United States Patent [19]

Loftis et al.

[11] 4,385,418

[45] May 31, 1983

[54] HINGE ASSEMBLY HAVING AN L-SHAPED LOCKING TAB

[75] Inventors: James R. Loftis, North Palm Beach; Myron C. Starr, Jupiter, both of Fla.

[73] Assignee: United Technologies Corporation, Hartford, Conn.

[21] Appl. No.: 291,873

[22] Filed: Aug. 10, 1981

[51] Int. Cl.³ ................................................ E05D 5/12
[52] U.S. Cl. ........................................ 16/381; 16/263; 403/154; 403/316
[58] Field of Search ................. 16/262, 263, 380, 381; 403/154, 155, 316, 317

[56] References Cited

U.S. PATENT DOCUMENTS

| | | | |
|---|---|---|---|
| 1,194,426 | 8/1916 | Richey . | |
| 1,387,989 | 8/1921 | Keaby | 403/154 |
| 1,392,561 | 10/1921 | Duffy . | |
| 1,512,551 | 10/1924 | McDonald . | |
| 1,817,438 | 8/1931 | Henry et al. | 16/381 X |
| 1,933,724 | 11/1933 | Fox | 24/224 |
| 2,562,649 | 7/1951 | Steensen | 16/169 |
| 2,590,450 | 3/1952 | Parsons | 189/36 |
| 2,711,801 | 6/1955 | Super et al. | 188/242 |
| 2,846,956 | 8/1958 | Small | 105/253 |
| 3,013,297 | 12/1961 | Ferry | 16/169 |
| 3,398,426 | 8/1968 | McGahee | 16/169 |
| 3,408,685 | 11/1968 | Anthony | 16/169 |
| 3,710,415 | 1/1973 | Wilson | 16/128 |

FOREIGN PATENT DOCUMENTS 1252728  12/1960  France ................................. 16/262

*Primary Examiner*—Fred A. Silverberg
*Attorney, Agent, or Firm*—Stephen E. Revis

[57] ABSTRACT

A hinge assembly includes a hinge pin which passes through interfitting knuckles of two leaves which are to be hinged. An L-shaped tab lock has, in one embodiment, one leg trapped between a pair of the knuckles and another leg which passes through a slot in the head of the hinge pin and is folded over to prevent axial movement of the pin relative to the tab lock and knuckles. Preferably a flat on the side of the pin head abuts a flat surface on one of the leaves to prevent movement of the pin relative to that leaf.

5 Claims, 3 Drawing Figures

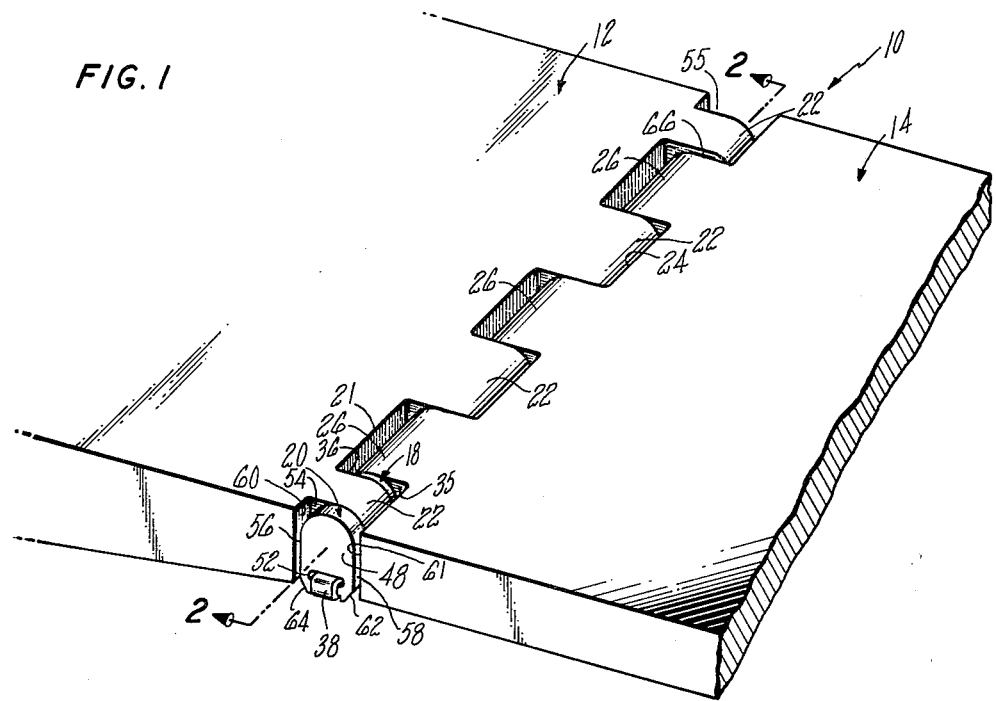

HINGE ASSEMBLY HAVING AN L-SHAPED LOCKING TAB

The Government has rights in this invention pursuant to Contract No. F33657-80-C-0008 awarded by the Department of the Air Force.

TECHNICAL FIELD

This invention relates to hinges.

BACKGROUND ART

Hinges of the type wherein a pin passes through interfitting knuckles often require some means for preventing the hinge pin from becoming disengaged during operation. Most commonly the hinge pin includes a head at one end and is provided with means, such as a cotter pin, threaded nut, or the like at its opposite end, to prevent unintentional removal or backing out of the pin. For applications where only one end of the hinge axis is accessible (or simply for convenience) locking means is provided at the accessible end of the hinge. For example, U.S. Pat. Nos. 1,392,561 and 2,562,649 describe hinge pin retaining clips which are snapped into place after assembly of the hinge. U.S. Pat. No. 3,398,426 describes a U-shaped sheet metal retainer wherein one leg of the retainer has a forked end which is disposed under the head of the hinge pin while the other end is disposed closely above the head of the pin and is secured to an element of the hinge assembly such that it is stationary relative to one of the hinge leaves. Thus, the pin cannot be removed and the hinge cannot be disassembled until the retainer is removed.

DISCLOSURE OF INVENTION

It is an object of the present invention to provide a hinge assembly with simplified hinge pin retaining means which can be assembled entirely from one end of the hinge joint.

Another object of the present invention is a hinge assembly with simplified means for preventing both axial movement and rotation of the hinge pin.

Accordingly, a hinge assembly includes a hinge pin, an L-shaped tab lock, and a pair of hinge leaves having interfitting knuckles with aligned holes therethrough for receiving the hinge pin, one leg of the tab lock being disposed between opposed flat surfaces of said knuckles and also having a hole therethrough aligned with the holes through the knuckles, wherein the head of the hinge pin has a slot therethrough and the other leg of the tab lock includes a finger extending through the slot, the finger being bent to prevent relative movement between the tab lock and the pin.

In a preferred embodiment the said one leg of the tab lock is trapped between a pair of adjacent knuckles and the pin head includes a flat side surface which abuts a flat surface on one of the hinge leaves thereby preventing movement of the hinge pin relative to that leaf.

The foregoing and other objects, features and advantages of the present invention will become more apparent in the light of the following detailed description of the preferred embodiments thereof as shown in the accompanying drawing.

BRIEF DESCRIPTION OF THE DRAWING

FIG. 1 is a perspective partial view of a hinge assembly according to the present invention.

FIG. 2 is a sectional view of the hinge assembly taken along the line 2—2 of FIG. 1.

FIG. 3 is a perspective view of the tab lock used in the present invention as it appears before being operably incorporated into the assembly.

BEST MODE FOR CARRYING OUT THE INVENTION

Referring to the exemplary embodiment of FIG. 1, a hinge assembly according to the present invention is designated by the reference numeral 10. The hinge assembly comprises a pair of leaves 12, 14, a hinge pin 16, and a retainer or tab lock 18. The pin 16 includes a shaft 19 and a head 20. The leaf 12, in this embodiment, is a movable leaf having an edge 21 with knuckles 22 extending outwardly therefrom. The leaf 14 is also a movable leaf having an edge 24 with knuckles 26 extending outwardly therefrom and interfitting between the knuckles 22. The knuckles 22, 26 have cylindrical passageways 28, 30 therethrough which are aligned with each other.

Prior to being operably incorporated into the hinge assembly, the tab lock 18 is L-shaped as shown in FIG. 3. One leg 32 of the tab lock has a hole 34 therethrough and is disposed or trapped between opposed facing surfaces 35, 36 which, in this embodiment, are opposed faces of adjacent knuckles 22, 26. The hole 34 is aligned with the passageways 28, 30. The other leg 37 of the tab lock 18 includes a bendable finger portion 38 which, prior to bending, extends toward the pin head 20 past the forward face 40 of the first knuckle 22.

The head 20 has a front face 48 and a rear face 50. The pin head 20 also includes a slot 52 therethrough from the front face 48 to the rear face 50. During assembly, as the pin shaft 19 is guided through the knuckles 22, 26 and the leg 32 of the tab lock 18, the finger 38 of the tab lock 18 is guided through the slot 52 in the pin head 20. The pin is inserted until the back face 50 of the pin head abuts the front face 40 of the knuckle 22. The leg 32 of the tab lock is urged against the rearwardly facing surface 35 of the knuckle 22; and the finger 38 is then bent down and back under the pin head 20, thereby preventing any relative movement between the tab lock 18 and the hinge pin 16. This effectively prevents axial movement of the pin 16 relative to the leaves 12, 14.

In this preferred embodiment the edges 21, 24 of the leaves 12, 14 extend past the knuckles 22 at the ends of the hinge line to define forward and rearward recesses 54, 55 respectively, for receiving the pin head 20. The pin head 20 includes a pair of oppositely facing flat surfaces 56, 58, both facing away from the axis of the shaft 19. The surface 56 is closely spaced from the surfaces 60 of the recess 54 and interferes therewith to prevent or minimize movement (rotation) of the pin 16 relative to the leaf 12. Sufficient clearance is, however, provided between the pin head surface 58 and the surface 61 of the recess 54 such that the leaf 14 can rotate relative to the leaf 12. A chamfer 62 on the pin head may be used to allow further rotation without increasing the clearance. A similar chamfer 64 on the other side of the pin head maintains symmetry to allow the pin to be inserted from either end of the hinge line. In this regard, a gap 66 is provided between the last pair of adjacent knuckles 22, 26 at the right end of the hinge line for accommodating the tab lock 18 when the pin is inserted from that end. If desired, leg 32 of the tab lock (rather than the pin head 20) could be designed to interfere with the edge 21 of the leaf 12 to prevent movement of the pin/tab lock assembly relative to the leaf 12.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A hinge assembly comprising:
   a pair of opposing hinge leaves, each leaf including an edge having a row of spaced apart knuckles extending outwardly therefrom, said knuckles of opposing leaves interfitting with each other and having aligned cylindrical passageways therethrough defining a hinge line;
   a hinge pin having a cylindrical shaft with a forward and rearward end, said shaft including a head at said forward end thereof, said head including a slot therethrough, said shaft extending through said aligned passageways, said pin head being disposed adjacent the first of said knuckles along said hinge line, one of said knuckles having a rearwardly facing surface spaced from said pin head; and
   an L-shaped locking tab made from sheet metal having a first leg and second leg, said first leg of said locking tab being disposed in abutting relationship to said rearwardly facing surface of said one knuckle and having a hole therethrough aligned with said passageways, said hinge pin shaft extending through said hole, said second leg of said tab extending toward said pin head and including a bendable finger at the end thereof, said finger extending through said slot in said pin head and being bent to engage said head in a manner preventing movement of said hinge pin relative to said locking tab.

2. The hinge assembly according to claim 1 wherein said hinge pin and locking tab define a pin/tab assembly and said pin/tab assembly includes means disposed in interfering relationship with one of said leaves such that there can be no substantial movement of said pin relative to said one of said leaves.

3. The hinge assembly according to claim 2 wherein said edge of said one of said leaves includes a first flat surface facing the axis of said hinge pin shaft, and said interfering means includes a second flat surface on said pin/tab assembly parallel to and closely adjacent said first flat surface.

4. The hinge assembly according to claim 3 wherein said second flat surface is a surface of said pin head.

5. The hinge assembly according to claims 1, 2, 3 or 4 wherein said first leg is trapped between a pair of adjacent interleaved knuckles.

* * * * *